United States Patent [19]

Hinz

[11] Patent Number: 5,069,545

[45] Date of Patent: Dec. 3, 1991

[54] LASER RADAR SYSTEM

[75] Inventor: Alexander Hinz, Königsbronn, Fed. Rep. of Germany

[73] Assignee: Carl-Zeiss-Stiftung, Heidenheim, Fed. Rep. of Germany

[21] Appl. No.: 486,767

[22] Filed: Mar. 1, 1990

[30] Foreign Application Priority Data

Mar. 4, 1989 [DE] Fed. Rep. of Germany ....... 3907042

[51] Int. Cl.$^5$ .............................................. G01P 3/36
[52] U.S. Cl. ..................................... 356/28.5; 356/4.5
[58] Field of Search ............................. 356/5, 28.5, 4.5

[56] References Cited

U.S. PATENT DOCUMENTS

| 3,409,370 | 11/1968 | King et al. | |
|---|---|---|---|
| 3,476,483 | 11/1969 | Weeks . | |
| 3,733,129 | 5/1973 | Bridges | 356/5 |
| 3,790,278 | 2/1974 | Buczek et al. | 356/28 |
| 3,860,343 | 1/1975 | Janney et al. | 356/5 |
| 3,901,597 | 8/1975 | White | 356/4 |
| 3,950,100 | 4/1976 | Keene et al. | 356/28 |
| 4,643,575 | 2/1987 | Hazeltine et al. | 356/28.5 |
| 4,861,159 | 8/1989 | Breen | 356/5 |

FOREIGN PATENT DOCUMENTS 1183492  3/1970  United Kingdom ................. 356/28

OTHER PUBLICATIONS

"Heterodyne and nonheterodyne laser transceivers" by R. J. Keyes, Review of Scientific Instruments 57 (4), Apr. 1986, pp. 519 to 528.

Primary Examiner—Stephen C. Buczinski
Attorney, Agent, or Firm—Walter Ottesen

[57] ABSTRACT

The invention is directed to a laser radar method for measuring velocity of moving objects wherein the laser light reflected from the measured object is coupled back into the laser resonator and then conducted to a heterodyne receiver. An amplification effect is produced by the interaction of the reflected signal with the laser active medium and the resonator and this amplification effect produces an improved signal/noise-ratio and makes possible a simpler configuration of the measuring arrangement.

14 Claims, 2 Drawing Sheets

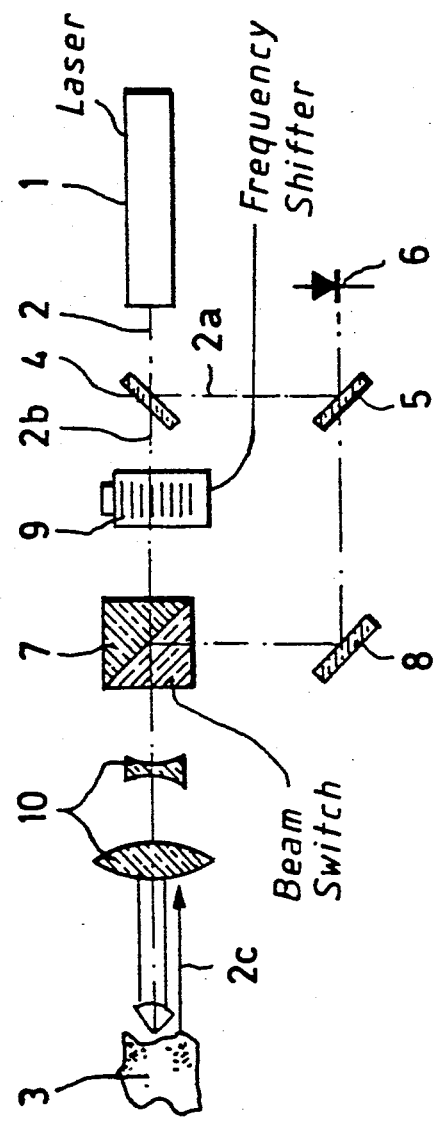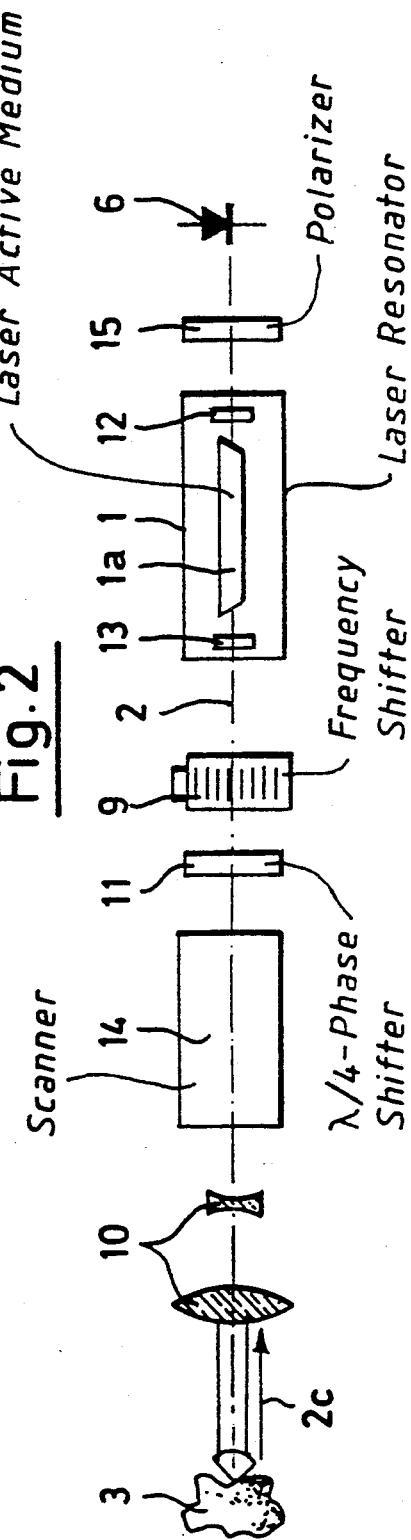

LASER RADAR SYSTEM

FIELD OF THE INVENTION

The invention relates to a laser radar method for measuring the velocity of moving objects. The object is illuminated with a laser transmitted beam and the light reflected from the object is detected with an optical heterodyne receiver. The invention also relates to an apparatus for carrying out the method.

BACKGROUND OF THE INVENTION

Laser radar methods and apparatus for measuring the velocity of moving objects with a laser transmitted beam are based on the premise that the frequency of the laser light backscattered from the object is subjected to a Doppler shift. The velocity of the irradiated object can be determined from the magnitude of this Doppler shift.

It is known to operate laser radar systems for measuring the velocity of moving objects either with a heterodyne system or a homodyne system.

Heterodyne and homodyne laser radar systems are described, for example, in the review article of Robert J. Keyes entitled "Heterodyne and nonheterodyne laser transceivers" published in the "Review of Scientific Instruments" 57 (4), April 1986, pages 519 to 528. A heterodyne arrangement and a homodyne arrangement with frequency shift for measuring velocity are shown in FIG. 1 of this article and are explained in the description provided therein.

SUMMARY OF THE INVENTION

It is an object of the invention to provide a method and apparatus for measuring the velocity of moving objects with a laser radar system which is also suitable for detecting moving and stationary objects and for measuring distance. It is a further object of the invention to provide such a method and apparatus which requires reduced complexity as to the apparatus and fewer adjustments than required by known apparatus and methods.

The laser radar method of the invention is for detecting stationary and movable objects and for measuring velocity. The method includes the steps of: illuminating the object with a laser transmitted beam generated by a laser defining a resonator; detecting the laser light reflected from the object with an optical heterodyne receiver; and, guiding the reflected light through the resonator and onto the optical heterodyne receiver.

According to a feature of the invention, the laser light reflected from the object is guided through the laser resonator onto the heterodyne receiver.

With this feedback of the laser light reflected from the object via the telescope into the laser resonator, a mix signal is observable on the heterodyne receiver in the case of a moving object having a frequency $\Delta f$ which is given by:

$$\Delta f = 2 f_o \cdot \frac{v}{c}$$

wherein: $f_o$ is the laser frequency, v is the velocity of the object and c is the velocity of light. An amplification effect is provided by the interaction of the backscattered signal with the laser active medium and the resonator. This provides an improved sensitivity compared to the configurations known in the state of the art.

The receiver bandwidth of the signal is given by the amplification bandwidth of the active medium (for a gas laser, this is essentially determined by the pressure) and the bandwidth of the optical resonator which is characterized by the finesse F:

$$F = \pi \cdot \frac{\sqrt[4]{R_o R_g}}{1 - \sqrt{R_o R_g}}$$

wherein: $R_o$, $R_g$ are effective reflectivities which contain intracavity losses of the laser resonator.

The bandwidth of the optical resonator can be wider than computed by the simple model of the finesse when considering higher transversal as well as longitudinal modes. This can be utilized for the homodyne receiver having frequency shift.

BRIEF DESCRIPTION OF THE DRAWINGS

The invention will now be described with reference to the drawings wherein:

FIG. 1 is a schematic representation of a laser radar system for measuring velocity of a moving object pursuant to the state of the art;

FIG. 2 is a schematic representation of a laser radar apparatus according to the invention for carrying out the method of the invention; and, FIG. 3 is a perspective view of the laser radar apparatus according to the invention.

DESCRIPTION OF THE PREFERRED EMBODIMENTS OF THE INVENTION

Figure 3:
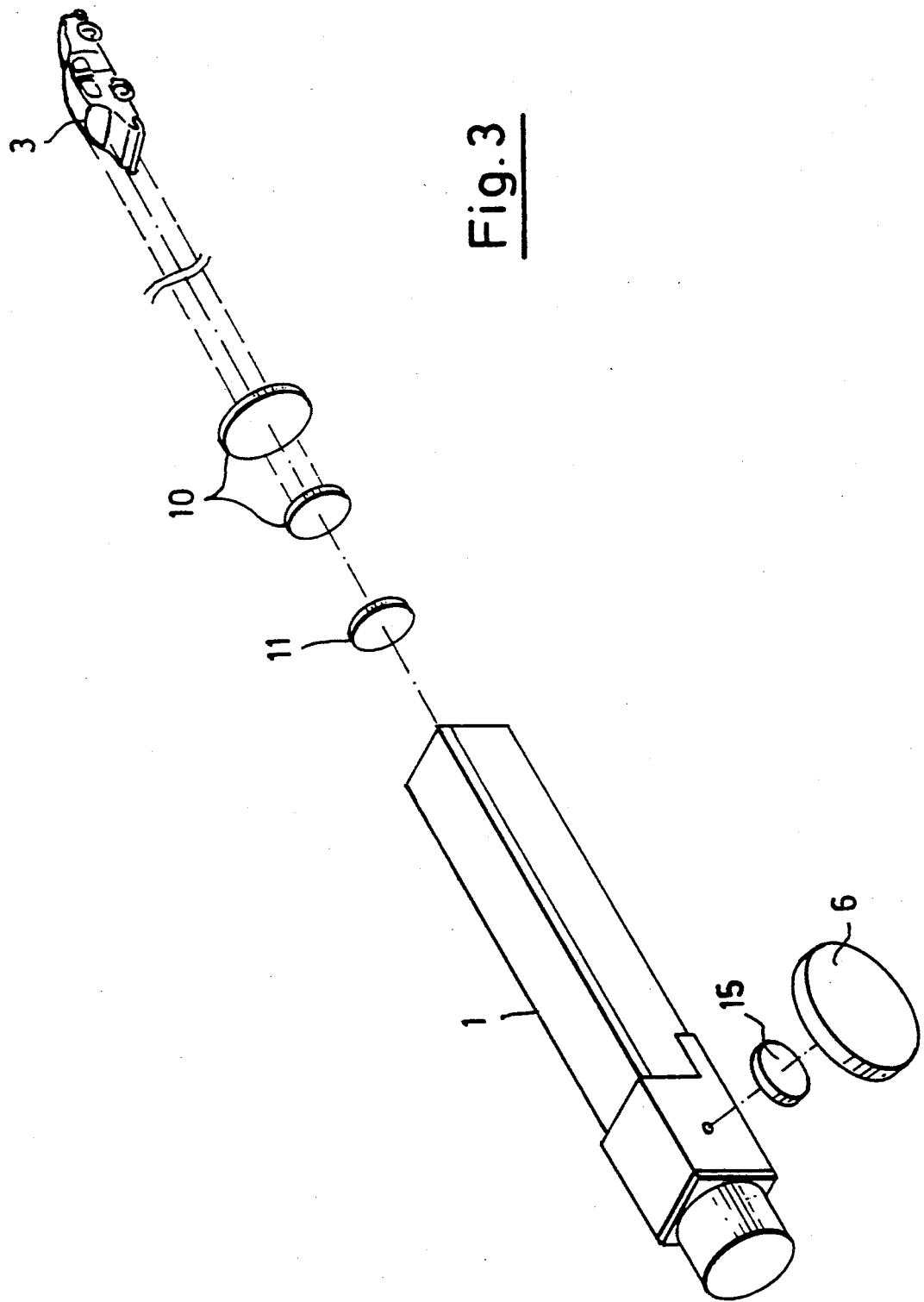

In FIG. 1, reference numeral 1 identifies the laser which transmits a laser beam in the direction of the object 3. A beam splitter 4 splits off a small component 2a of the laser light and this component in the form of a local oscillator beam reaches a detector 6 configured as a heterodyne receiver via a further beam splitter 5. The remainder or larger component 2b of the laser transmitted beam illuminates the object 3. The laser light 2c backscattered from the object is guided to the heterodyne receiver 6 via a beam switch 7, a deflector mirror 8 and the partially transparent beam splitter 5. At the heterodyne receiver, the backscattered light 2c becomes superposed with the local oscillator beam 2a and generates the heterodyne signal having a frequency proportional to the velocity of the object 3. Reference numeral 9 identifies a frequency shifter which can, for example, be configured as a Bragg cell and reference numeral 10 identifies a telescope.

The embodiment of FIG. 2 includes a laser 1, a heterodyne receiver 6, a frequency shifter 9, a λ/4-phase shifter 11, and a telescope 10. Reference numeral 3 identifies the object.

In the apparatus according to the invention, the laser light backscattered from the object 3 does not reach the detector 6 outside of the laser resonator 1; instead, the backscattered light is coupled back into the laser resonator 1 before it reaches the detector 6. The interaction of the backscattered signal with the laser active medium 1a and the resonator 1 produces an amplification effect which provides a better signal/noise-ratio compared to the configuration shown in FIG. 1.

A polarizer 15 can be mounted ahead of the heterodyne receiver 6 and the out-coupling elements (13 and 12) can be configured on the transmitting end as an outcoupling mirror 13 and on the heterodyne receiver end, as a polarization selective element 12, respectively. The frequency shifter 9 mounted in the transmitted beam 2 can advantageously be configured as a Bragg cell. A λ/4-phase shifter 11 and a scanner 14 can be provided between the frequency shifter 9 and the telescope 10. The spatial coordinates of the object are determined by collinearly guiding the laser transmitted light beam 2 and the laser reflected light 2c through the scanner 14.

The Bragg cell 9 can be configured to impart a frequency offset to the laser reflected light. Also, one of the out-coupling elements (13, 12) can be a reflection grating in a Littrow arrangement.

In the embodiment of FIG. 3, the reference numerals are the same for corresponding components in FIG. 2.

It is understood that the foregoing description is that of the preferred embodiments of the invention and that various changes and modifications may be made thereto without departing from the spirit and scope of the invention as defined in the appended claims.

What is claimed is:

1. A laser radar method for detecting stationary and movable objects and for measuring velocity, the method comprising the steps of:

illuminating the object with a laser transmitted beam generated by a laser defining a laser resonator thereby causing laser light to be backscattered from the object;

generating a laser beam with a laser defining a laser resonator containing a medium with the resonator having a first natural frequency corresponding to a transversal mode thereof and a second natural frequency corresponding to a longitudinal mode thereof;

passing the laser beam through a λ/4-phase shifter and illuminating the object with the laser beam thereby causing light to be backscattered from the object;

passing the backscattered light through a frequency shifter for imparting a frequency offset to the backscattered light;

selecting the frequency shifter to have a predetermined doubled modulation frequency which corresponds to one of said first and second natural frequencies;

coupling the backscattered laser light into the laser resonator; and, passing the backscattered light from the laser resonator to an optical element for defining the polarization direction of the backscattered light and a polarizer whereafter the backscattered light is passed to and detected by an optical heterodyne receiver.

2. The laser radar method of claim 1, the method comprising the further step of collinearly passing the laser transmitted beam and the reflected light through a scanner to determine the spatial coordinates of the object.

3. The laser radar method of claim 1, wherein the frequency shifter is a Bragg cell.

4. A laser radar apparatus for detecting stationary and movable objects and for measuring velocity, the apparatus comprising:

a laser for generating a laser transmitted beam;

a telescope for directing the laser transmitted beam toward the object thereby producing a reflected laser light;

an optical heterodyne receiver;

said laser defining a beam axis and being disposed between said heterodyne receiver and said telescope;

a λ/4-phase shifter arranged on said beam downstream of said laser viewed in the direction of said laser transmitted beam;

said laser including a resonator for receiving and passing the reflected laser light to said heterodyne receiver; and, a laser active medium for interacting with the reflected laser light to produce an amplification effect thereby providing an improved signal-to-noise ratio;

said resonator further including a first out-coupling element arranged on said beam axis so as to be disposed between said laser active medium and said telescope and a second out-coupling element arranged between said laser active medium and said heterodyne receiver;

a polarizer disposed between said second out-coupling element and said heterogyne receiver;

said second out-coupling element being an optical element for defining the polarization direction of the laser reflected light passed to said heterodyne receiver;

said heterodyne receiver being disposed directly rearward of said second out-coupling element;

a frequency shifter mounted on said beam axis between said laser and said telescope for imparting a frequency offset to said reflected laser light; and, said frequency shifter having a predetermined doubled modulation frequency and said resonator having a first natural frequency corresponding to a transversal mode thereof and a second natural frequency corresponding to a longitudinal mode thereof, and said doubled modulation frequency being selected so as to correspond to one of said first and second natural frequencies.

5. The laser radar apparatus of claim 4, said second out-coupling element being a polarization selective out-coupling element having different reflectivities and transmissions for different polarization directions of the reflected laser light.

6. The laser radar apparatus of claim 5, one of said out-coupling elements being a reflection grating in a Littrow arrangement.

7. The laser radar apparatus of claim 4, said second out-coupling element being a polarization selective out-coupling element having different reflectivities and transmissions for different polarization directions of the reflected laser light.

8. The laser radar apparatus of claim 7, said resonator being dimensioned so as to cause only low intercavity losses except for the mirror transmission.

9. The laser radar apparatus of claim 8, wherein the transmission of said resonator at the end thereof facing toward said heterodyne receiver is selected so as to cause said heterodyne receiver to operate at the quantum noise limit and below saturation.

10. The laser radar apparatus of claim 9, wherein the transmission of said resonator at the end thereof facing toward the object is selected so as to cause the laser to operate so close to the threshold that a reproducible operation is just still possible.

11. The laser radar apparatus of claim 10, said laser being a $CO_2$-laser.

12. The laser radar apparatus of claim 4, wherein said frequency shifter is a Bragg cell.

13. A laser radar method for detecting stationary and movable objects and for measuring velocity, the method comprising the steps of:

illuminating the object with a laser transmitted beam generated by a laser defining a laser resonator containing a medium thereby causing laser light to be backscattered from the object;

generating a laser beam with a laser defining a laser resonator containing a medium with the resonator having a first natural frequency corresponding to a transversal mode thereof and a second natural frequency corresponding to a longitudinal mode thereof;

passing the laser beam through a $\lambda/4$-phase shifter and illuminating the object with the laser beam thereby causing light to be backscattered from the object;

passing the backscattered light through a frequency shifter for imparting a frequency offset to the backscattered light;

selecting the frequency shifter to have a predetermined doubled modulation frequency which corresponds to one of said first and second natural frequencies;

coupling the backscattered laser light into the laser resonator for interacting with the laser medium to produce an amplification effect thereby providing an improved signal-to-noise ratio; and, passing the backscattered light from the laser resonator to an optical element for defining the polarization direction of the backscattered light and a polarizer whereafter the backscattered light is passed to and detected by an optical heterodyne receiver.

14. The laser radar apparatus of claim 13, wherein said frequency shifter is a Bragg cell.

* * * * *

UNITED STATES PATENT AND TRADEMARK OFFICE
CERTIFICATE OF CORRECTION

PATENT NO. : 5,069,545

DATED : December 3, 1991

INVENTOR(S) : Alexander Hinz

It is certified that error appears in the above-identified patent and that said Letters Patent is hereby corrected as shown below:

In column 4, line 5, between "beam" and "downstream", insert -- axis --.

In column 4, line 21: delete "heterogyne" and substitute -- heterodyne -- therefor.

Signed and Sealed this

Thirtieth Day of March, 1993

Attest:

STEPHEN G. KUNIN

*Attesting Officer*  *Acting Commissioner of Patents and Trademarks*